United States Patent Office 3,097,198
Patented July 9, 1963

3,097,198
AZO DYESTUFFS
Brian Ribbons Fishwick and James Wardleworth, Manchester, England, assignors to Imperial Chemical Industries Limited, London, England, a corporation of Great Britain
No Drawing. Filed Jan. 29, 1960, Ser. No. 5,378
Claims priority, application Great Britain Feb. 10, 1959
4 Claims. (Cl. 260—207.1)

This invention relates to new azo dyestuffs and more particularly it relates to new water-insoluble azo dyestuffs which are valuable for the dyeing of artificial textile materials.

According to the invention we provide the new water-insoluble azo dyestuffs of the formula

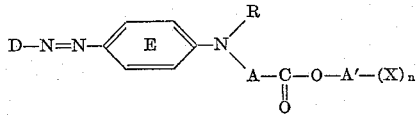

wherein D represents a mono- or bi-cyclic aromatic nucleus, R stands for a lower alkyl or aralkyl group, either of which may carry non-ionogenic substituents, or for the group

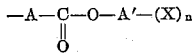

A represents a —CH$_2$— or —CH$_2$CH$_2$— group, A' represents a saturated di- or tri-valent aliphatic radical of from 1 to 4 carbon atoms, X represents a cyano, lower alkoxy, carbo(lower alkoxy), carbonamido, acyl, acyloxy, acylamido, amino, alkylamino, dialkylamino, or monocyclic aryl radical, n is 1 or 2, and the nuclei D and E may carry non-ionogenic substituents.

The mono- or bi-cyclic aromatic radical represented by D may be carbocyclic, for example benzene or naphthalene, or heterocyclic, for example thiazole or benzthiazole and may carry non-ionogenic substituents for example nitro-, cyano-, thiocyano-, methylsulphonyl-, trifluoromethyl-, sulphamyl and halogeno- such as chloro- or bromo-.

As examples of non-ionogenic substituents which may be carried by the benzene nucleus E there may be mentioned alkyl groups such as methyl or ethyl, halogen atoms such as chlorine or bromine, alkoxy groups such as methoxy and ethoxy, acylamido groups such as acetamido, and trifluoromethyl groups.

As examples of substituted and unsubstituted groups which may be represented by R there may be mentioned methyl, ethyl, propyl, butyl, cyanoethyl, acetoxyethyl, carbethoxyethyl, methoxyethyl, carbonamidoethyl, benzyl and p-nitrobenzyl.

As examples of di- or tri-valent aliphatic radicals which may be represented by A' there may be mentioned the radicals —CH$_2$—, —CH$_2$CH$_2$—, —CH$_2$CH$_2$CH$_2$—, —CH$_2$CH$_2$CH$_2$CH$_2$— and —CH=.

As specific examples of radicals which may be represented by X there may be mentioned methoxy, ethoxy, carbomethoxy, carbethoxy, methylcarbonyl, acetoxy, acetamido, ethylamino, diethylamino, phenyl and p-nitrophenyl.

According to a further feature of the invention we provide a process for the manufacture of the new water-insoluble azo dyestuffs which comprises coupling a diazotised amine of the formula D—NH$_2$ wherein D has the meaning stated above with a coupling component of the formula

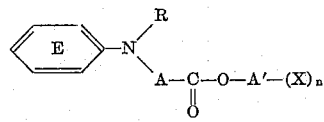

wherein E, R, A, A', X and n have the meanings stated above.

As specific examples of amines of the formula D—NH$_2$ which may be used in the process of the invention there may be mentioned p-nitroaniline, 2-chloro-4-nitroaniline, 2-chloro-4-methylsulphonylaniline, 2-cyano-4-nitroaniline, 2-trifluoromethyl - 4 - nitroaniline, 1-naphthylamine-4-sulphonamide, 2-amino - 6 - methylsulphonylbenzthiazole, 2-amino-6-nitrobenzthiazole, 2-amino-6-thiocyanobenzthiazole, 2-amino-6-cyanobenzthiazole, 2-aminobenzthiazole, p-aminophenylmethylsulphone, p-cyanoaniline, o-cyanoaniline, 2:6-dichloro-4-nitroaniline, 2-chloro-4-cyanoaniline, 2:4-dicyanoaniline, 2:4-dinitroaniline and 2-amino-5-nitrothiazole.

As specific examples of coupling components which may be used in the process of the invention there may be mentioned N-ethyl-N-β-carbo(cyanomethoxy)ethylaniline, N - ethyl-N-β-carbo(methylcarbonylmethoxy)ethylaniline, N-ethyl-N-β-carbo(diethylaminoethoxy)ethylaniline, N-ethyl-N-β-carbo(p-nitrobenzyloxy)ethylaniline, N-ethyl-N-β-carbo(methoxymethoxy)ethylaniline, N - ethyl-N-β-carbo(carbethoxymethoxy)ethylaniline, N-ethyl-N-β-carbo(carbonamidomethoxy)ethylaniline, N : N - di[β-carbo(cyanomethoxy)ethyl]aniline, N-ethyl-N - β - carbo (β'-cyanoethoxy)-ethylaniline, N-ethyl-N - β - carbo-(β'-acetoxyethoxy)ethylaniline, N-methyl-N-β-carbo-(cyanomethoxy)ethyl-m-chloroaniline, N - β - cyanoethyl-N-β-carbo(cyanomethoxy)ethylaniline, N-β-acetoxyethyl-N-β'-carbo(cyanomethoxy)ethyl-m-toluidine, N-β-carbo-methoxyethyl - N - β'-carbo(cyanomethoxy)ethylaniline, N-β-methoxyethyl-N-β' - carbo-(cyanomethoxy)ethyl-m-toluidine, N-β-carbon-amidoethyl-N-β'-carbo(cyanomethoxy)-ethylaniline, N-ethyl-N-β-carbo(cyanomethoxy)-m-chloroaniline, N - ethyl-N-β-carbo(cyanomethoxy)-m-anisidine, N - ethyl-N-carbo(cyanomethoxy)methylaniline, N-ethyl-N-β-carbo(dicarbethoxymethoxy)ethylaniline, N-ethyl-N-β-carbo(β'-aminoethoxy)ethylaniline and N-benzyl-N-β-carbo(cyanomethoxy)ethylaniline.

The process of the invention may be conveniently brought about by adding an aqueous solution of the diazonium compound to a solution of the coupling component in aqueous sulphuric or hydrochloric acid, if desired in the presence of a water-miscible inert organic solvent such as acetone, then adding an alkaline reagent such as sodium acetate to neutralise mineral acid, stirring until coupling is complete and filtering off the dyestuff which is precipitated.

The coupling components used in the process of the invention may be obtained by reaction of a carboxylic acid of the formula

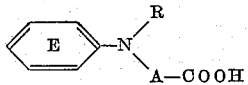

with a halogeno-compound of the formula Ha—A′—(X)$_n$ wherein Ha stands for a halogen atom, for example chlorine or bromine. Reaction between the carboxylic acid and halogeno compound may be brought about by heating a mixture of chemically equivalent quantities of the reagents in the presence of a base such as triethylamine. When reaction is complete it is convenient to isolate the product by adding an organic solvent such as ethyl acetate, filtering from the insoluble hydrohalide of the base, removing the solvent by distillation, and if desired distilling the product under reduced pressure.

According to a further feature of our invention we provide a process for the manufacture of the new water-insoluble azo-dyestuffs as hereinbefore defined which comprises condensing a carboxylic acid of the formula

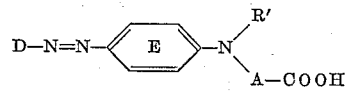

wherein D, E and A have the meanings previously stated and R′ stands for a lower alkyl or aralkyl group either of which may carry non-ionogenic substituents or for the group A—COOH, with a halogeno compound of the formula Ha—A′—(X)$_n$, wherein A′, X and $n$ have the meaning previously stated and Ha stands for a chlorine or bromine atom.

Condensation between the carboxylic acid of the above formula and the halogeno compound may conveniently be brought about by heating (for example for 18 hours) a mixture of the two reagents in the presence of a base, such as triethylamine and an inert solvent for the dyestuff for example ethyl acetate. The hydrohalide of the base may then be filtered off and the dyestuff isolated by evaporation of the solvent.

According to yet a further feature of the invention we provide a process for the manufacture of those new water-insoluble azo-dyestuffs as hereinbefore defined wherein X represents an acylamido radical which comprises acylating a water-insoluble azo-dyestuff as hereinbefore defined wherein X represents an amino radical by treatment with an acid chloride or anhydride.

As examples of acid chlorides and anhydrides which may be used in this process of the invention there may be mentioned acetyl chloride, propionyl chloride and acetic anhydride.

This process of the invention may conveniently be brought about by heating (for example boiling under reflux) a mixture of the dyestuff wherein X represents an amino radical with the acid chloride or anhydride and pyridine. When acylation is complete (for example after heating for 30 minutes) the mixture may be poured into water and the acylated dyestuff isolated by filtration and washing.

The new water-insoluble azo dyestuffs, as hereinbefore defined, are valuable for dyeing textile materials comprising artificial fibres, for example cellulose acetate rayon, cellulose triacetate and polyester fibres. For dyeing such textile materials it is preferred to use the new azo dyestuffs in a finely dispersed form which may be obtained by milling the azo dyestuffs with water and a dispersing agent, for example the disodium salt of methylene dinaphthalene sulphonic acid. If desired, the so-obtained dispersed aqueous paste of the dyestuff may be dried to form a re-dispersible powder which may be obtained in a non-dusting form by any of the processes known for forming non-dusting powders.

The new water-insoluble azo dyestuffs have excellent affinity for textile materials comprising artificial fibres which they dye in orange to blue shades possessing very good fastness to light, washing and to dry heat treatments.

Those new water-insoluble azo dyestuffs as hereinbefore defined in which X stands for a carbalkoxy group or especially for a cyano-group have exceptionally high affinity for aromatic polyester textile material on which dyeings of extremely bright and solid hue may be obtained, possessing excellent fastness to light, to washing and to dry heat treatments.

Those new water-insoluble azo dyestuffs as hereinbefore defined in which D represents a p-nitrophenyl nucleus which may be further substituted have excellent fastness to light.

Those new water-insoluble azo dyestuffs as hereinbefore defined in which D represents a 2-benzthiazyl nucleus which may be further substituted have exceptionally good fastness to dry heat treatments.

The invention is illustrated but not limited by the following examples in which the parts are by weight.

Example 1

A solution of 2.62 parts of p-nitroaniline in a mixture of 8 parts of water and 8 parts of 10 N hydrochloric acid at 90° C. is added to a stirred mixture of 20 parts of water and 80 parts of ice. A solution of 1.4 parts of sodium nitrite in 9.5 parts of water is added immediately afterwards. The mixture is stirred for 15 minutes and then excess nitrous acid is removed by addition of a little sulphamic acid. The mixture is filtered and the solution added dropwise during 15 minutes to 4.41 parts of N-ethyl - N - [β-carbo(cyanomethoxy)ethyl]aniline in a mixture of 50 parts of water, 3 parts of 10 N hydrochloric acid and 50 parts of acetone to produce a clear solution, between 5° C. and 10° C. Saturated sodium acetate solution is then added until the mixture is no longer acid to Congo red test paper and the mixture is then stirred for 30 minutes. The product is filtered off, reslurried with 300 parts of water which is then made alkaline by addition of soda ash, refiltered, washed with water and dried. 4 - nitro - 4′ - [N - ethyl-N-β-carbo(cyanomethoxy)ethylamino]azobenzene is obtained in the form of a red powder which when dispersed in water by milling with the disodium salt of methylene dinaphthylene sulphonic acid dyes aromatic polyester textile materials in bright scarlet shades of solid hue having excellent fastness to dry heat and light.

In place of 4.41 parts of N-ethyl-N-[β-carbo(cyanomethoxy)ethyl]-aniline as coupling component in Example 1 there may be used an equivalent weight of one of the coupling components listed below. The products all dye aromatic polyester textile material in shades which have very good fastness to dry heat and excellent fastness to light.

| Ex. | Coupling component | Shade on aromatic polyester textile material |
|---|---|---|
| 2 | N-ethyl-N-β-carbo-(methylcarbonyl-methoxy)ethylaniline | Scarlet. |
| 3 | N-ethyl-N-β-carbo(dicarbethoxymethoxy)-ethylaniline. | Pink. |
| 4 | N-ethyl-N-β-carbo(β′-diethylaminoethoxy)-ethylaniline | Orange. |
| 5 | N-ethyl-N-β-carbo(p-nitrobenzyloxy)ethylaniline. | Do. |
| 6 | N-ethyl-N-β-carbo(methoxymethoxy)ethylaniline | Scarlet. |
| 7 | N:N-di[β-carbo(cyanomethoxy)ethyl]aniline | Orange. |
| 8 | N-ethyl-N-β-carbo-(β′-cyanomethoxy)ethylaniline. | Scarlet. |
| 9 | N-ethyl-N-β-carbo-(carbonamidomethoxy)-ethylaniline. | Do. |
| 10 | N-ethyl-N-β-carbo-(β′-acetoxyethoxy)ethylaniline. | Do. |
| 11 | N-β-cyanoethyl-N-β′-carbo-(cyanomethoxy)-ethylaniline. | Reddish-orange. |
| 12 | N-methyl-N-β-carbo-(cyanomethoxy)-ethyl-m-chloroaniline. | Do. |
| 13 | N-β-methoxyethyl-N-β′-carbo-(cyanomethoxy)-ethyl-m-toluidine. | Red. |
| 14 | N-ethyl-N-carbo-(cyanomethoxy)methylaniline. | Reddish-orange. |
| 15 | N-benzyl-N-β-carbo(cyanomethoxy)ethylaniline. | Do. |
| 16 | N-β-acetoxyethyl-N-β-carbo(cyanomethoxy)-ethyl-m-toluidine. | Scarlet. |

Example 17

The diazo solution obtained from 3.45 parts of p-nitroaniline by the method described in Example 1 is added dropwise during 15 minutes to a solution of 5.1 parts of N-ethyl-N-β-carboxyethylaniline in a mixture of 12.5 parts of water and 3 parts of 10 N hydrochloric acid, at between 5° C. and 10° C. 4 N sodium acetate solution is added until the mixture is no longer acid to Congo red test paper and the mixture is then stirred for 30 minutes. The product is filtered off, washed with water and dried.

5.5 parts of the product obtained in this way are dissolved in 300 parts of ethyl acetate; 1.6 parts of triethylamine and 2.95 parts of ethyl chloroacetate are added and the mixture is boiled under reflux for 18 hours, then filtered. The solution is evaporated to a small volume, cooled and the solid product is filtered off and dried. 4-nitro-4′-[N-ethyl-N-β-carbo(carbethoxymethoxy)ethylamino]-azobenzene is obtained in the form of a red powder which when dispersed in water dyes polyethylene terephthalate fibre in bright scarlet shades of solid hue, having very good fastness to dry heat and to light.

Example 18

To a warm solution of 2.59 parts of 2-chloro-4-nitroaniline in 20 parts of glacial acetic acid is added with stirring 4.5 parts of 10 N hydrochloric acid. The mixture is cooled to 10° C. and a solution of 1.1 parts of sodium nitrite in 7.5 parts of water, previously cooled to 5° C., is quickly added. The mixture is stirred at between 5° C. and 10° C. for 15 minutes, then diluted with 20 parts of cold water and excess nitrous acid removed by addition of a little sulphamic acid. The diazo solution so obtained is added during 15 minutes to a solution of 3.48 parts of N-ethyl-N-β-carbo(cyanomethoxy)ethylaniline in a mixture of 50 parts of water, 3 parts of 10 N hydrochloric acid and 50 parts of acetone. Saturated sodium acetate solution is then added until the mixture is no longer acid to Congo-red test paper and the mixture is stirred for 2 hours. The product is then isolated by a procedure exactly similar to that described for the product of Example 1.

2-chloro-4-nitro-4′[N-ethyl-N-β-carbo(cyanomethoxy)-ethylamino]-azobenzene is obtained in the form of a red powder which when redispersed in water, dyes aromatic polyester textile material in red shades of solid hue having very good fastness to dry heat and to light.

The following table gives further examples of the shades obtained on aromatic polyester textile materials by using the dyestuffs obtained by diazotising the amines listed in the second column of the table and coupling with the coupling components listed in the third column of the table by the method described in Example 18. All the dyestuffs have very good fastness to dry heat and excellent fastness to light.

| Ex. | Amine | Coupling component | Shade on aromatic polyester textile material |
|---|---|---|---|
| 19 | 2-chloro-4-nitroaniline. | N:N-bis-[β-carbo-(cyanomethoxy)-ethyl]aniline. | Orange-brown. |
| 20 | 2-chloro-4-methylsulphonylaniline. | N-ethyl-N-β-carbo-(cyanomethoxy)-ethylaniline. | Bright-orange. |
| 21 | 2-chloro-4-nitroaniline. | N-ethyl-N-β-carbo-(carbonamidomethoxy)ethylaniline. | Orange-brown. |
| 22 | ---do--- | N-ethyl-N-β-carbo-(β′-acetoxyethoxy)-ethylaniline. | Reddish-brown. |
| 23 | ---do--- | N-β-cyanoethyl-N-β′-carbo(cyanomethoxy)ethylaniline. | Dull red. |
| 24 | ---do--- | N-ethyl-N-carbo-(cyanomethoxy)-methylaniline. | Dull scarlet. |
| 25 | 2-chloro-4-cyanoaniline. | N-methyl-N-β-carbo-(cyanomethoxy)-ethyl-m-chloroaniline. | Reddish orange. |
| 26 | 2-chloro-4-methylsulphonylaniline. | N-β-cyanoethyl-N-β′-carbo(cyanomethoxy)ethylaniline. | Orange. |

Example 27

A solution of nitrosyl sulphuric acid is prepared by adding 1.4 parts of sodium nitrite to 22 parts of concentrated sulphuric acid during 30 minutes, while the temperature is maintained at between 20° C. and 27° C. This solution is added to a rapidly stirred suspension of 4.56 parts of 2-amino-6-methylsulphonylbenzthiazole in a mixture of 27 parts of sulphuric acid and 5 parts of water which is stirred in a freezing mixture to maintain the temperature below −3° C. 40 parts of water is added to the resulting mixture, keeping the temperature below 10° C. and the mixture is then stirred in an ice bath for 30 minutes. The resulting diazonium solution is added to 5.58 parts of N-ethyl-N-β-carbo-(carbethoxymethoxy)-ethylaniline in 100 parts of water, 10 parts of 2 N hydrochloric acid and sufficient acetone to produce a clear solution at 0–10° C. 50 parts of 10 N sodium hydroxide is then added maintaining the temperature below 10° C. After stirring the mixture for a further hour, the solid product is filtered off, reslurried with 300 parts of water which is then made alkaline by addition of soda ash, refiltered, washed with water and dried. The product is 4-[-ethyl-N-β-carbo(carbethoxymethoxy)ethylamino] - 6′ - methylsulphonylbenzene-azo(2′)-benzthiazole. When redispersed in water by milling with the disodium salt of methylene dinaphthylene sulphonic acid it dyes polyethylene terephthalate fibre in bright red shades of good solidity which have exceptionally good fastness to dry heat and very good fastness to light.

The following table gives further examples of the shades obtained on aromatic polyester textile material by using the dyestuffs obtained by diazotising the amines listed in the second column of the table and coupling with the coupling components listed in the third column of the table by the method described in Example 27. All the dyestuffs have exceptionally good fastness to dry heat and very good fastness to light.

| Ex. | Amine | Coupling component | Shade on aromatic polyester textile material |
|---|---|---|---|
| 28 | 2-amino-6-methylsulphonylbenzthiazole. | N-ethyl-N-β-carbo-(methoxymethoxy)-ethylaniline. | Red. |
| 29 | ---do--- | N-ethyl-N-β-carbo-(cyanomethoxy)-ethylaniline. | Red. |
| 30 | ---do--- | N-ethyl-N-β-carbo-(methylcarbonyl-methoxy)ethylaniline. | Red. |
| 31 | ---do--- | N-ethyl-N-β-carbo(dicarbethoxymethoxy)-ethylaniline. | Red. |
| 32 | 2-amino-6-nitro-benzthiazole. | N-ethyl-N-β-carbo(cyanomethoxy)-ethylaniline. | Red. |
| 33 | 2-amino-6-cyanobenzthiazole. | ---do--- | Red. |
| 34 | 2-amino-6-thiocyanobenzthiazole. | ---do--- | Red. |
| 35 | ---do--- | N:N-di-[β-carbo-(cyanomethoxy)-ethyl]aniline. | Orange-red. |
| 36 | ---do--- | N-ethyl-N-β-carbo-(β′-cyanoethoxy)-ethylaniline. | Red. |
| 37 | ---do--- | N-ethyl-N-β-carbo-(carbonamidomethoxy)ethylaniline. | Red. |
| 38 | ---do--- | N-ethyl-N-β-carbo-(β′acetoxyethoxy)-ethylaniline. | Red. |
| 39 | 2-aminobenzthiazole. | N-ethyl-N-β-carbo-(cyanomethoxy)ethylaniline. | Red. |

Example 40

1.81 parts of sodium nitrite are added to 36 parts of concentrated sulphuric acid at between 2° C. and 27° C. during 30 minutes. 4.15 parts of 2-amino-5-nitrobenzonitrile is then added between 20° C. and 25° C. during 1 hour. After stirring for a further two hours, the solution is poured into a mixture of 125 parts of ice and 30 parts of water and the resulting solution filtered. The diazonium solution so obtained is added to a stirred solution of 6.25 parts of N-ethyl-N-β-carbo-(methylcarbonylmethoxy)-ethylaniline in 125 parts of water and 15 parts of 2 N hydrochloric acid, at between 5° C. and 10° C.

The mixture is neutralised to Congo red paper by addition of saturated aqueous sodium acetate solution, then stirred for 30 minutes. The solid product is filtered off, reslurried with 300 parts of water which is then made alkaline by addition of soda ash, refiltered, washed with water and dried.

The product is 4-nitro-2-cyano-4'-[N-ethyl-N-β-carbo-(methylcarbonylmethoxy)ethylamino]-azobenzene.

When redispersed in water it dyes aromatic polyester textile material in reddish violet shades of solid hue which have good fastness to dry heat and to light.

In place of N-ethyl-N-β-carbo(methylcarbonylmethoxy)-ethylaniline as coupling component in this example may be used an equivalent of one of the coupling components listed below. The products obtained all dye polyethylene terephthalate fibre in shades which have good fastness to dry heat and to light.

| Ex. | Coupling component | Shade on aromatic polyester textile material |
|---|---|---|
| 41 | N-ethyl-N-β-carbo(cyanomethoxy)-ethylaniline | Reddish violet. |
| 42 | N - ethyl - N - β - carbo(carbethoxymethoxy)-ethylaniline | Do. |
| 43 | N - ethyl - N - β - carbo(methoxymethoxy)-ethylaniline | Violet. |
| 44 | N:N-di-[carbo(cyanomethoxy)ethyl]-aniline | Reddish-brown. |
| 45 | N - ethyl - N - β - carbo(β- cyanoethoxy) - ethyl-aniline | Brown. |
| 46 | N-ethyl-N-β-carbo(carbonamidomethoxy)-ethylaniline. | Reddish-brown. |

*Example 47*

The product obtained by coupling diazotised 2-amino-5-nitrobenzotrifluoride with N-ethyl-N-β-carbo(cyanomethoxy)ethylaniline by a procedure similar to that described in Example 40, dyes polyethylene terephthalate fibre in bluish-red shades of good fastness to dry heat and to light.

*Example 48*

0.75 part of sodium nitrite are added during 15 minutes to 9 parts of sulphuric acid, at 20–30° C. The resulting solution is cooled to 5° C. and a mixture of 8.5 parts of acetic acid and 1.5 parts of propionic acid is added during 20 minutes at 5–15° C. The solution is cooled to 0° C. and 1.45 parts of 2-amino-5-nitrothiazole is added during 20 minutes at 0–5° C. A mixture of 8.5 parts of acetic acid and 1.5 parts of propionic acid is then added dropwise over 20 minutes at 0–5° C. and the resulting mixture stirred at this temperature for 3 hours. This solution is added during 15 minutes to a solution of 2.76 parts N-β-methoxyethyl - N - β' - carbo - (cyanomethoxy)ethyl-m-toluidine in 70 parts of water and 6 parts of 2 N hydrochloric acid, stirring at 0–10° C. After stirring the mixture for a further 1 hour, the product is filtered off, reslurried with water and made alkaline with soda-ash, refiltered, washed with water until the washings are free of alkali, and finally dried.

The product is 2-methyl-4-[N-β-methoxyethyl-N-β'-carbo - (cyanomethoxy)ethylamino] - 5' - nitro - benzene-azo(2')-thiazole. When redispersed in water it dyes aromatic polyester textile materials in reddish-blue shades of very good fastness to dry heat.

*Example 49*

In place of N-ethyl-N-β-carbo(cyanomethoxy)ethylaniline in Example 1 there is used a stoichiometrically equivalent amount of N-ethyl-N-β-carbo(β'-aminoethoxy) ethylaniline. The dyestuff obtained dyes aromatic polyester materials in scarlet shades.

*Example 50*

2.4 parts of the dyestuff of Example 49 is boiled under reflux for 30 minutes in a mixture of 25 parts of pyridine and 5 parts of acetic anhydride. The solution is poured into 300 parts of water and the precipitated dyestuff is filtered off and dried. 4-nitro-4'-[N-ethyl-N-β-carbo-(β'-acetamidoethoxy)ethylamino]azo-benzene is obtained, which when dispersed in water, dyes aromatic polyester textile materials in scarlet shades.

The coupling components used in the above examples may be prepared as follows:

N-ethyl - N - β - carbocyanomethoxyethylaniline. To a mixture of 29 parts of N-ethyl-N-β-carboxyethylaniline and 20 parts of triethylamine, 15 parts of chloroacetonitrile is added. The mixture is heated to between 90° C. and 100° C. for 1 hour, then extracted with 500 parts of ethyl acetate. The solution is filtered, then extracted with 100 parts of 10% aqueous sodium bicarbonate solution and dried over magnesium sulphate. The solvent is removed by distillation and the product distilled at a pressure of 0.1 millimetre of mercury, collecting the fraction boiling at 145–50° C. The oil so-obtained has the following analysis: Found, C, 67.4; H, 7.1; $C_{13}H_{16}O_2N_2$ requires C, 67.2; H, 6.9%.

By using other halogeno compounds in place of the chloroacetonitrile used above, other coupling components may be obtained. Thus there may be obtained:

N-ethyl - N - β - carbo(methylcarbonylmethoxy)ethylaniline from chloroacetone.

N-ethyl-N-β - carbo(dicarbethoxymethoxy)ethylaniline from bromodiethylmalonate.

N-ethyl - N - β-carbo(diethylaminoethoxy)ethylaniline from N:N-diethyl-β-chloroethylamine.

N-ethyl-N-β-carbo(p-nitrobenzyloxy)ethylaniline from p-nitrobenzyl chloride.

N-ethyl-N-β-carbo(methoxymethoxy)ethylaniline from chlorodimethyl ether.

N-ethyl - N - β-carbo(carbethoxymethoxy)ethylaniline from ethylchloroacetate.

N-ethyl-N-β-carbo - (β'-cyanoethoxy)ethylaniline from β-chloropropionitrile.

N-ethyl - N - β-carbo-(carbonamidomethoxy)ethylaniline from chloroacetamide.

N-ethyl-N-β-carbo-(β'-acetoxyethoxy)ethylaniline from β-chloroethylacetate.

N-ethyl-N-β-carbo - (β'-aminoethoxy)ethylaniline from β-chloroethylamine.

By using chloroacetonitrile and other carboxylic acids in place of the N-ethyl - N - β - carboxyethylaniline used above, other coupling components may be obtained. Thus there may be obtained:

N-β-cyanoethyl-N-β'-carbo - (cyanomethoxy)ethylaniline from N-β-cyanoethyl-N-β'-carboxyethylaniline, which may itself be obtained by heating N-β-carboxyethylaniline with acrylonitrile in the presence of acetic acid.

N-methyl-N-β-carbo - (cyanomethoxy)ethyl-m-chloroaniline from N-methyl-N-β-carboxyethyl-m-chloroaniline, which may itself be obtained by heating N-methyl-m-chloroaniline with ethyl acrylate in the presence of cuprous chloride and acetic acid and hydrolysing the product with aqueous alkali.

N-β-methoxyethyl - N - β'-carbo-(cyanomethoxy)ethyl-m-toluidine from N-β-methoxyethyl - N - β'-carboxyethyl-m-toluidine, which may itself be obtained by heating N-β-methoxyethyl-m-toluidine with ethyl acrylate in the presence of cuprous chloride and acetic acid, and hydrolysing the product with aqueous alkali.

N-ethyl-N-carbo - (cyanomethoxy)methylaniline from N-ethyl-N-carboxymethylaniline, which may itself be obtained by condensing N-ethylaniline with ethyl chloracetate in the presence of calcium carbonate and hydrolysing the product with aqueous alkali.

N-benzyl - N-β-carbo(cyanomethoxy)ethylaniline from N-benzyl-N-β-carboxyethylaniline, which may itself be obtained by reacting N-benzylaniline with ethyl acrylate in acetic acid, and hydrolysing the product with aqueous alkali.

N-ethyl - N:N-di[β-carbo(cyanomethoxy)ethyl]aniline from N:N-di-β-(carboxyethyl)aniline.

N-β-acetoxyethyl - N - β'-carbo-(cyanomethoxy)ethylm-toluidine from N-β-acetoxyethyl-N-β'-carboxyethyl-m-toluidine, which may itself be obtained by acylating N-β-hydroxyethyl-m-toluidine with acetic anhydride in the presence of perchloric acid and treating the product with an aqueous solution of acrylic acid in the presence of copper salts.

N-ethyl - N:N-di[β-carbo(cyanomethoxy)ethyl]aniline may be obtained in a similar manner from N:N-di(β-carboxyethyl)aniline.

What we claim is:
1. Water-insoluble azo dyestuffs of the formula:

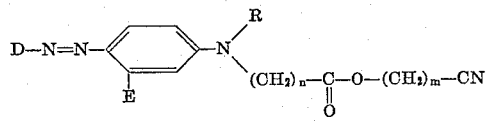

wherein
D is a member selected from the class consisting of benzene, thiazole, and benzthiazole radicals carrying at least one of the substituents selected from the class consisting of nitro, cyano, thiocyano, methylsulfonyl, trifluoromethyl, and chlorine;

R stands for a member selected from the class consisting of lower alkyl, and cyano-, acetoxy-, methoxy-, and carbo(lower alkoxy)- lower alkyl, and benzyl, and the grouping

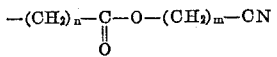

$m$ and $n$ are integers from 1 to 2; and E is a member selected from the class consisting of hydrogen, lower alkyl, and chlorine.

2. 4-nitro-4'-[N-ethyl - N - β - carbo(cyanomethoxy)-ethylamino] azobenzene.

3. 2-chloro-4-nitro-4'-[N - β - cyanoethyl - N-β'-carbo-(cyanomethoxy)ethylamino]azobenzene.

4. 2-chloro-4-cyano-4'-[N-methyl - N - β-carbo(cyanomethoxy)ethylamino]-2'-chloro-azobenzene.

References Cited in the file of this patent
UNITED STATES PATENTS 2,373,700     McNally et al. _____ Apr. 17, 1945
2,830,043     Merian _____ Apr. 8, 1958